United States Patent
Tsubaki

(10) Patent No.: US 9,387,877 B2
(45) Date of Patent: Jul. 12, 2016

(54) ELECTRIC POWER STEERING APPARATUS
(71) Applicant: NSK LTD., Tokyo (JP)
(72) Inventor: Takahiro Tsubaki, Maebashi (JP)
(73) Assignee: NSK Ltd., Tokyo (JP)
( * ) Notice: Subject to any disclaimer, the term of this patent is extended or adjusted under 35 U.S.C. 154(b) by 0 days.
(21) Appl. No.: 14/759,991
(22) PCT Filed: Jan. 14, 2014
(86) PCT No.: PCT/JP2014/050421
§ 371 (c)(1),
(2) Date: Jul. 9, 2015
(87) PCT Pub. No.: WO2014/119359
PCT Pub. Date: Aug. 7, 2014
(65) Prior Publication Data
US 2015/0353125 A1 Dec. 10, 2015
(30) Foreign Application Priority Data

Jan. 29, 2013 (JP) .................. 2013-014603
Feb. 7, 2013 (JP) .................. 2013-022663
Feb. 12, 2013 (JP) .................. 2013-024406

(51) Int. Cl.
 *B62D 5/04* (2006.01)
 *B62D 6/02* (2006.01)
 (Continued)
(52) U.S. Cl.
 CPC .............. *B62D 5/0463* (2013.01); *B62D 1/286* (2013.01); *B62D 6/02* (2013.01); *B62D 6/08* (2013.01)
(58) Field of Classification Search
 CPC ....... B62D 5/0463; B62D 1/286; B62D 6/008
 See application file for complete search history.

(56) References Cited

U.S. PATENT DOCUMENTS 6,082,482 A * 7/2000 Kato .................. B62D 5/0466
 180/402

6,863,150 B1 * 3/2005 Tanaka ................ B62D 5/0463
 180/443
(Continued)

FOREIGN PATENT DOCUMENTS

JP 08-310417 A 11/1996
JP 2002-369565 A 12/2002
(Continued)

OTHER PUBLICATIONS

International Search Report of PCT/JP2014/050421 dated Apr. 22, 2014.

*Primary Examiner* — Thomas Tarcza
*Assistant Examiner* — Alex C Dunn
(74) *Attorney, Agent, or Firm* — Sughrue Mion, PLLC

(57) ABSTRACT

[Problem]
An object of the present invention is to provide an electric power steering apparatus that does not give uncomfortable feeling to a driver by detecting that the driver steers a steering wheel in an automatic steering mode by means of a steering torque from a torque sensor and switching to a manual steering mode by a capacity (an integrated value) corresponding to the occurring torque magnitude.
[Means for solving the problem]
The present invention comprises a steering angle control section that calculates a motor current command value 2, a torque integral judging section that outputs a steering torque judging signal by integrating a steering torque, which is compared with a threshold, and a switching section that inputs the motor current command value 1 and the motor current command value 2, and is switched in accordance with a switching signal or the steering torque judging signal; the torque integral judging section comprises a torque value comparing section, an integral calculating section and a switch judging section; and the switching section is switched depending on a switching command of an automatic steering mode and a manual steering mode or the steering torque judging signal.

20 Claims, 14 Drawing Sheets

(51) Int. Cl.
*B62D 6/08* (2006.01)
*B62D 1/28* (2006.01)

(56) References Cited

U.S. PATENT DOCUMENTS

| 7,171,296 | B2* | 1/2007 | Kato | B60T 8/172 |
| | | | | 303/146 |
| 7,418,372 | B2* | 8/2008 | Nishira | B60K 31/0008 |
| | | | | 700/44 |
| 8,078,361 | B2* | 12/2011 | Galkowski | B62D 15/025 |
| | | | | 180/446 |
| 8,437,890 | B2* | 5/2013 | Anderson | B60W 30/09 |
| | | | | 701/23 |
| 8,543,261 | B2* | 9/2013 | Anderson | B60W 30/09 |
| | | | | 701/3 |
| 8,660,749 | B2* | 2/2014 | Hayama | B62D 6/003 |
| | | | | 180/204 |
| 2002/0013647 | A1* | 1/2002 | Kawazoe | B62D 1/28 |
| | | | | 701/41 |
| 2004/0200662 | A1* | 10/2004 | Tajima | B62D 6/008 |
| | | | | 180/402 |
| 2005/0125131 | A1* | 6/2005 | Kato | B60T 8/172 |
| | | | | 701/70 |
| 2008/0040002 | A1* | 2/2008 | Galkoswki | B62D 6/003 |
| | | | | 701/43 |
| 2009/0125187 | A1* | 5/2009 | Yamamoto | B62D 5/0457 |
| | | | | 701/42 |
| 2015/0291210 | A1* | 10/2015 | Kageyama | B60T 8/1755 |
| | | | | 701/41 |

FOREIGN PATENT DOCUMENTS

| JP | 2004-017881 A | 1/2004 |
| JP | 2004-351999 A | 12/2004 |
| JP | 3845188 B2 | 11/2006 |
| JP | 2012-011862 A | 1/2012 |

* cited by examiner

PRIOR ART

ELECTRIC POWER STEERING APPARATUS

CROSS REFERENCE TO RELATED APPLICATIONS

This is a National Stage of International Application No. PCT/JP2014/050421 filed Jan. 14, 2014, claiming priority based on Japanese Patent Application No. 2013-014603 filed Jan. 29, 2013, Japanese Patent Application No. 2013-022663 filed Feb. 7, 2013, and Japanese Patent Application No. 2013-024406 filed Feb. 12, 2013, the contents of all of which are incorporated herein by reference in their entirety.

TECHNICAL FIELD

The present invention relates to an electric power steering apparatus that has functions of an automatic steering mode (a parking support mode) and a manual steering mode and provides a steering system of a vehicle with an assist force by means of a motor, and in particular to an electric power steering apparatus that improves performance of a switching judgment from the automatic steering mode to the manual steering mode.

BACKGROUND ART

An electric power steering apparatus which provides a steering mechanism of a vehicle with a steering assist torque (assist force) by means of rotational torque of a motor applies driving force of the motor as the steering assist torque to a steering shaft or a rack shaft by means of a transmission mechanism such as gears or a belt through a reduction mechanism. In order to accurately generate the steering assist torque, such a conventional electric power steering (EPS) apparatus performs a feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty of a PWM (Pulse Width Modulation) control.

A general configuration of a conventional electric power steering apparatus will be described with reference to FIG. 1. As shown in FIG. 1, a column shaft (a steering shaft) 2 connected to a steering handle (a steering wheel) 1 is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (ECU) 100 for controlling the electric power steering apparatus from a battery 13, and an ignition key signal is inputted into the control unit 100 through an ignition key 11. The control unit 100 calculates a steering assist command value of an assist (steering assist) command based on the steering torque Th detected by the torque sensor 10 and a vehicle speed Vel detected by a vehicle speed sensor 12, and controls a current supplied to the motor 20 based on a current control value E obtained by performing compensation and so on with respect to the steering assist command value. Moreover, it is also possible to receive the vehicle speed Vel from a CAN (Controller Area Network) and so on.

In such the electric power steering apparatus, the control unit 100 is, for example, configured as shown in FIG. 2 disclosed in Japanese Published Unexamined Patent Application No. 2002-369565 A.

In FIG. 2, the motor 20 that generates the steering assist torque of the electric power steering apparatus is driven by a motor driving section 21, the motor driving section 21 is controlled by the control unit 100 shown by a two-dot chain line, and the the steering torque Th from the torque sensor 10 and the vehicle speed Vel from the vehicle speed detecting system are inputted into the control unit 100. A voltage Vm between the motor terminals and a motor current value i are measured and outputted in the motor 20.

The control unit 100 comprises a torque system control section 110 that performs the control by means of the steering torque Th and is shown by a broken line, and a motor system control section 120 that performs the control related to a drive of the motor 20 and is shown by a dashed line. The torque system control section 110 comprises an assist amount calculating section 111, a differential control section 112, a yaw-rate convergence control section 113, a robust stabilization compensating section 114, and a self aligning torque (SAT) estimation feedback section 115, and includes an adding section 116A and 116B and a subtracting section 116C. Further, the motor system control section 120 comprises a compensating section 121, a disturbance estimating section 122, a motor angular speed calculating section 123, a motor angular acceleration calculating section 124, and a motor characteristic compensating section 125, and includes an adding section 126A and 126B.

The steering torque Th is inputted into the assist amount calculating section 111, the differential control section 112, the yaw-rate convergence control section 113 and the SAT estimation feedback section 115, which all input the vehicle speed Vel as a parameter. The assist amount calculating section 111 calculates an assist torque amount based on the steering torque Th. The yaw-rate convergence control section 113 inputs the steering torque Th and a motor angular speed ω, and puts a brake on an action of the steering wheel whirling in order to improve the convergence of the vehicle yaw. Further, the differential control section 112 improves the control responsibility near a neutral point of the steering wheel, and achieves smooth steering. The SAT estimation feedback section 115 inputs the steering torque Th, a signal made by adding an output from the differential control section 112 to an output from the assist amount calculating section 111 in the adding section 116A, the motor angular speed ω calculated in the motor angular speed calculating section 123 and a motor angular acceleration α, estimates an SAT, performs signal processing of the estimated SAT by means of a feedback filter, and gives an appropriate road-surface information to the steering wheel as reaction force.

Further, a signal made in the adding section 116B by adding an output from the yaw-rate convergence control section 113 to a signal made in the adding section 116A by adding an output from the differential control section 112 to an output from the assist amount calculating section 111 is inputted as an assist amount AQ into the robust stabilization compensating section 114. The robust stabilization compensating section 114 is, for example, a compensating section shown in Japanese Published Unexamined Patent Application No. H8-290778 A, eliminates a resonance frequency peak of a resonator system comprising an inertial element and a spring element included by the detected torque, and compensates a phase shift of a resonance frequency to inhibit the responsibility and the stability of a control system. An assist amount Ia that is capable of transmitting the road-surface information to the steering wheel as reaction force is obtained by subtracting an output of the SAT estimation feedback section 115 from an output of the robust stabilization compensating section 114 in the subtracting section 116C.

Moreover, the motor angular speed calculating section 123 calculates the motor angular speed abased on the voltage Vm between the motor terminals and the motor current value i, and the motor angular speed ω is inputted into the motor angular acceleration calculating section 124, the yaw-rate convergence control section 113 and the SAT estimation feedback section 115. The motor angular acceleration calculating section 124 calculates the motor angular acceleration α based on the inputted motor angular speed ω, and the calculated motor angular acceleration α is inputted into the motor characteristic compensating section 125 and the SAT estimation feedback section 115. The assist amount Ia left by the subtraction of the output of the SAT estimation feedback section 115 from the output of the robust stabilization compensating section 114 is added to an output Ic of the motor characteristic compensating section 125 in the adding section 126A, and the adding signal is inputted as a current command value Ir into the compensating section 121 comprising a differential compensating section and so on. A signal made in the adding section 126B by adding an output from the disturbance estimating section 122 to a current command value Ira compensated in the compensating section 121 inputted into the motor driving section 21 and the disturbance estimating section 122. The disturbance estimating section 122 is such an apparatus as shown in Japanese Published Unexamined Patent Application No. H8-310417 A, is capable of maintaining a motor control characteristic desired on an output standard of a control system based on the signal made by adding the output from the disturbance estimating section 122 to the current command value Ira that is a control target of a motor output and is compensated in the compensating section 121 and the motor current value i, and prevents the loss of the stability of the control system.

In such the electric power steering apparatus, vehicles provided with a parking support function (parking assist) and switching an automatic steering mode and a manual steering mode recently appear. The vehicle provided with the parking support function sets a target steering angle based on data such as a camera (an image), a distance sensor and so on, and performs automatic control according to the target steering angle.

In the electric power steering apparatus having the well-known functions of the automatic steering mode (the parking support mode) and the manual steering mode, back parking and parallel parking are hitherto performed automatically by controlling an actuator (a motor) based on the relation between a vehicle moving distance and a steering angle stored beforehand.

Thus the conventional electric power steering apparatus stops the automatic steering control when a driver steers a steering wheel in the automatic steering mode and the steering torque is judged to exceed a predetermined value set beforehand. However, when performing the judgment only by comparing the output of the torque sensor with the predetermined value, there is a problem that the output of the torque sensor exceeds the predetermined value temporarily because of a noise of the torque sensor or an inertial torque of the steering wheel appearing in the case of a tire stepping on a pebble or automatic steering by the motor, and each time the automatic steering control is made stopped. When the predetermined value is set to high in order to avoid such an inconvenience, not only does the interaction between the automatic steering mode and the manual steering mode give uncomfortable feeling to the driver, but also there is a possibility that the automatic steering control is not immediately stopped even if the driver steers the steering wheel in the automatic steering control.

As an automatic steering apparatus solving such a problem, for example, Japanese Patent No. 3845188 B2 (Patent Document 1) is proposed. The apparatus disclosed in Patent Document 1 sets plural kinds of the predetermined values and changes a predetermined time corresponding to each predetermined value in an automatic steering apparatus for a vehicle that comprises a moving locus setting means for storing or calculating vehicle moving locus to a target position, an actuator (a motor) for steering a wheel, a steering torque detecting means (a torque sensor) for detecting a steering torque that a driver applies to a steering wheel, and an actuator control means for controlling the actuator drive based on the moving locus set by the moving locus setting means and at the same time stopping an actuator control based on the moving locus when the steering torque over the predetermined value set beforehand is detected for more than the predetermined time.

THE LIST OF PRIOR ART DOCUMENTS

Patent Documents

Patent Document 1: Japanese Patent No. 3845188 B2

SUMMARY OF THE INVENTION

Problems to be Solved by the Invention

However, the apparatus disclosed in Patent Document 1 stops the automatic steering control when the predetermined time corresponding to the steering torque of the driver passes. There are problems that it is complicated to set plural kinds of the predetermined values and change the predetermined time corresponding to each predetermined value, and a calculation load is large.

The present invention has been developed in view of the above-described circumstances, and an object of the present invention is to provide an electric power steering apparatus that does not give uncomfortable feeling to the driver in the vehicle having functions of the automatic steering mode and the manual steering mode by detecting that the driver steers the steering wheel in the automatic steering mode by means of the steering torque from the torque sensor and switching to the manual steering mode when a capacity (an integrated value) corresponding to the occurring torque magnitude becomes over a predetermined value or over a predetermined value set finely.

Means for Solving the Problems

The present invention relates to an electric power steering apparatus that calculates a motor current command value 1 based on a steering torque and a vehicle speed, drives a motor based on said motor current command value 1 so as to perform an assist control of a steering system, and has a function for switching an automatic steering mode and a manual steering mode, the above-described object of the present invention is achieved by that comprising: a steering angle control section that calculates a motor current command value 2 to get an actual steering angle close to a target steering angle; a torque integral judging section that outputs a steering torque judging signal by integrating said steering torque, which is compared with a predetermined threshold; and a switching section that inputs said motor current command value 1 and said motor current command value 2, and is switched in accordance with a switching signal or said steering torque judging signal;

wherein said torque integral judging section comprises a torque value comparing section that compares an absolute value of said steering torque with a torque threshold so as to output a predetermined signal, an integral calculating section that integrates said predetermined signal, and a switch judging section that compares an integral value from said integral calculating section with an integral threshold so as to output said steering torque judging signal; and wherein said switching section is switched depending on a switching command of said automatic steering mode and said manual steering mode or said steering torque judging signal.

The present invention relates to an electric power steering apparatus that calculates a motor current command value 1 based on a steering torque and a vehicle speed, drives a motor based on said motor current command value 1 so as to perform an assist control of a steering system, and has a function for switching an automatic steering mode and a manual steering mode, the above-described object of the present invention is achieved by that comprising: a steering angle control section that calculates a motor current command value 2 to get an actual steering angle close to a target steering angle; a torque integral judging section that outputs a steering torque judging signal by integrating said steering torque, which is compared with a predetermined threshold; and a switching section that inputs said motor current command value 1 and said motor current command value 2, and is switched in accordance with a switching signal or said steering torque judging signal; wherein said torque integral judging section comprises plural torque value comparing sections that compare an absolute value of said steering torque with plural torque thresholds so as to output each predetermined signal, plural integral calculating sections that integrate said each predetermined signal, and a switch judging section that compares each integral value from said plural integral calculating sections with corresponding plural integral thresholds so as to output said steering torque judging signal; and wherein said switching section is switched depending on a switching command of said automatic steering mode and said manual steering mode or said steering torque judging signal.

Effects of the Invention

According to the electric power steering apparatus of the present invention, it is possible in the vehicle having the automatic steering mode (the parking support function) and the manual steering mode to shorten the time required for switching judgment as the steering torque is larger because of integrating the steering torque when the steering torque becomes over a predetermined torque threshold and moreover performing the switching control by comparing the magnitude of the integrated value with a predetermined integral threshold. The electric power steering apparatus does not give uncomfortable feeling to the driver especially in case of switching to the manual steering mode in the automatic steering mode because of performing the switching judgment not by passage of time but by the integrated value of the steering torque.

Further, there is an advantage that it is not necessary to have plural thresholds of the steering torque and plural setting values of the judgment time, a configuration is simple, and it is possible to decrease a calculation load.

BRIEF DESCRIPTION OF THE DRAWINGS

In the accompanying drawings.

MODE FOR CARRYING OUT THE INVENTION

The present invention, in an electric power steering apparatus of a vehicle having functions of an automatic steering mode and a manual steering mode, detects that a driver steers a steering wheel in the automatic steering mode by means of a steering torque from a torque sensor, at the same time switches to the manual steering mode when a capacity (an integrated value) corresponding to the occurring torque magnitude becomes over a predetermined value, and does not give uncomfortable feeling to the driver in any situation.

In the case of performing the judgment by means of plural thresholds, it is possible to give uncomfortable feeling to the driver in any situation and attain the quick and certain switching to the manual steering mode.

Hereinafter, an embodiment of the present invention will be described with reference to the accompanying drawings in detail.

Figure 1:
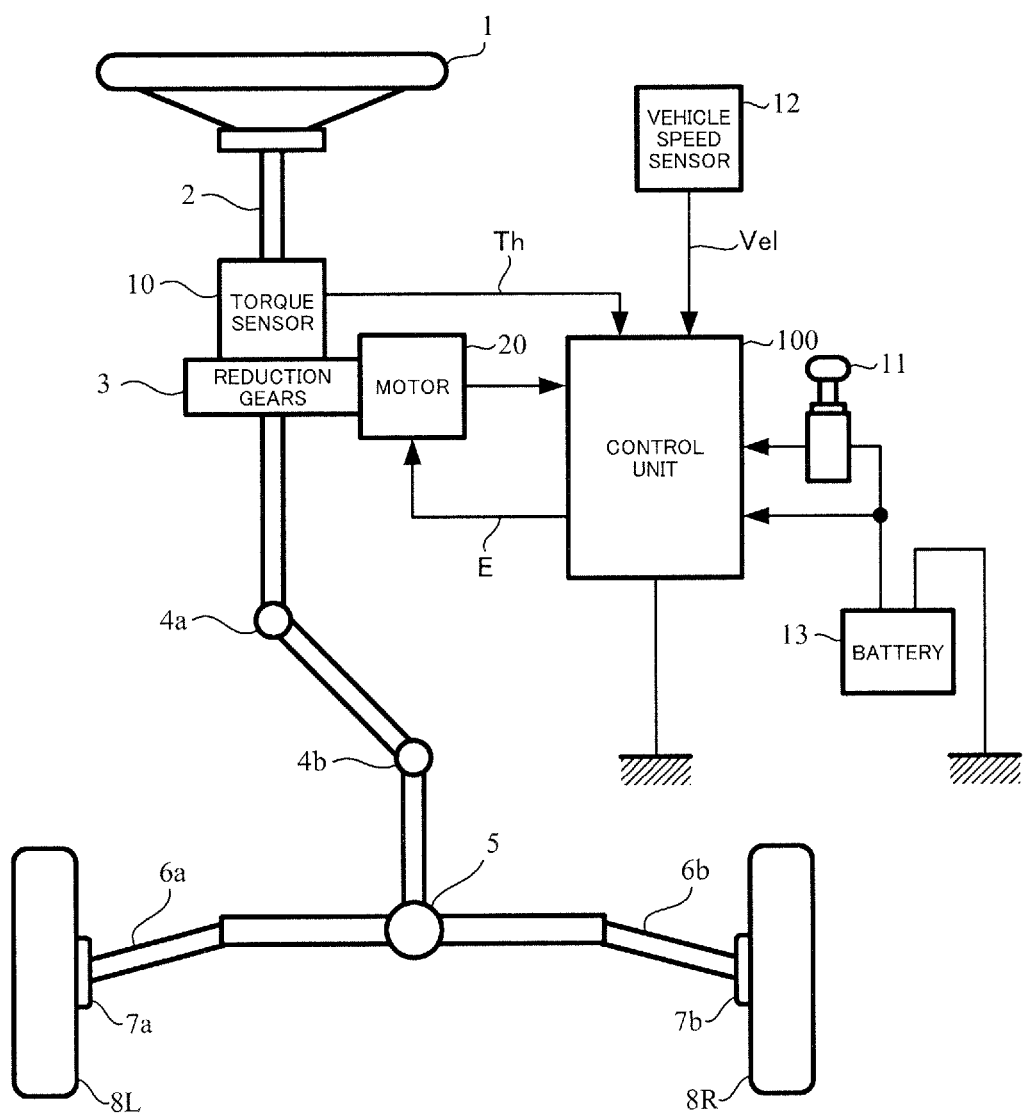
FIG. 1 is a configuration diagram illustrating a general outline of an electric power steering apparatus.
Figure 2:
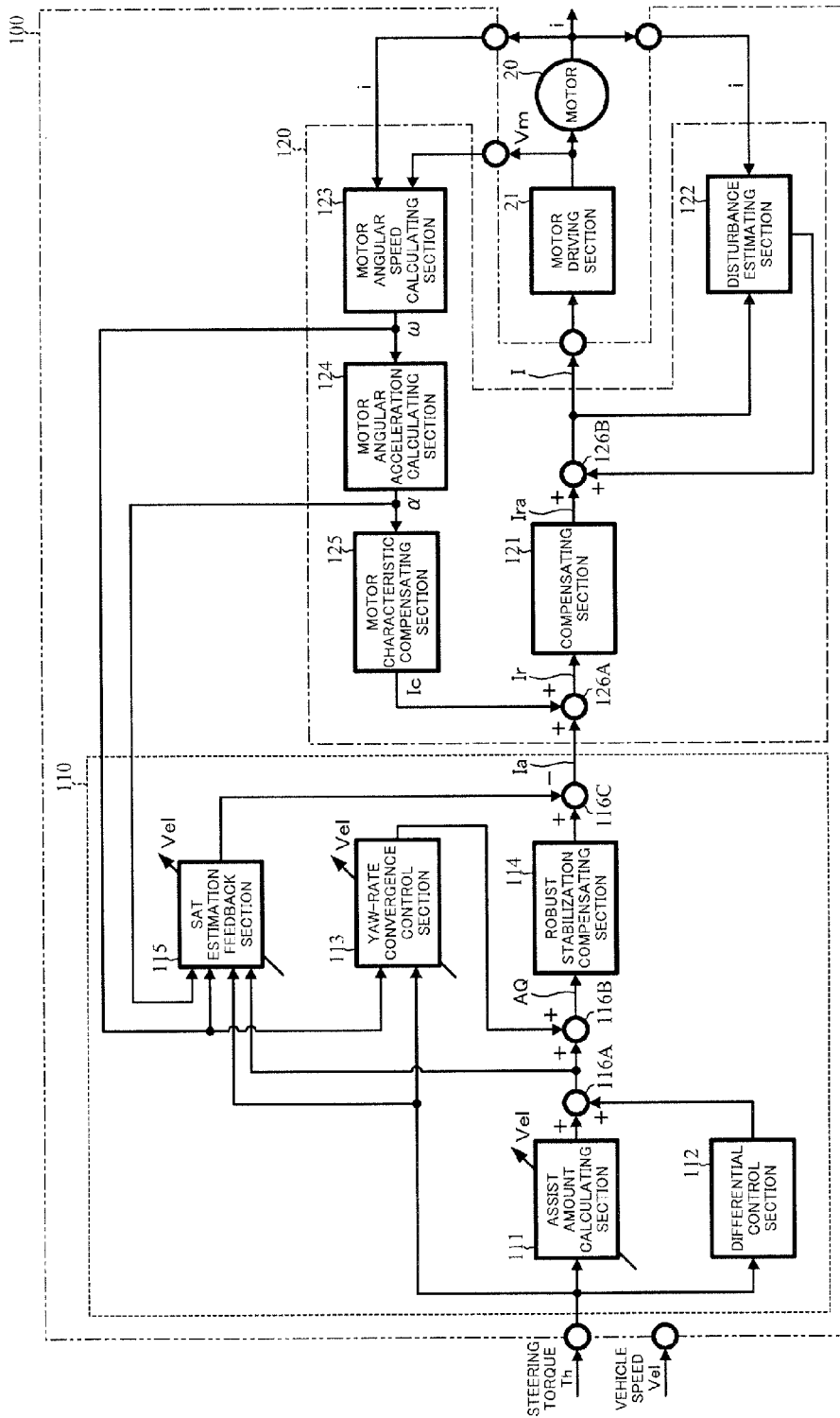
FIG. 2 is a block diagram showing a configuration example of a control system in a conventional electric power steering apparatus.
Figure 3:
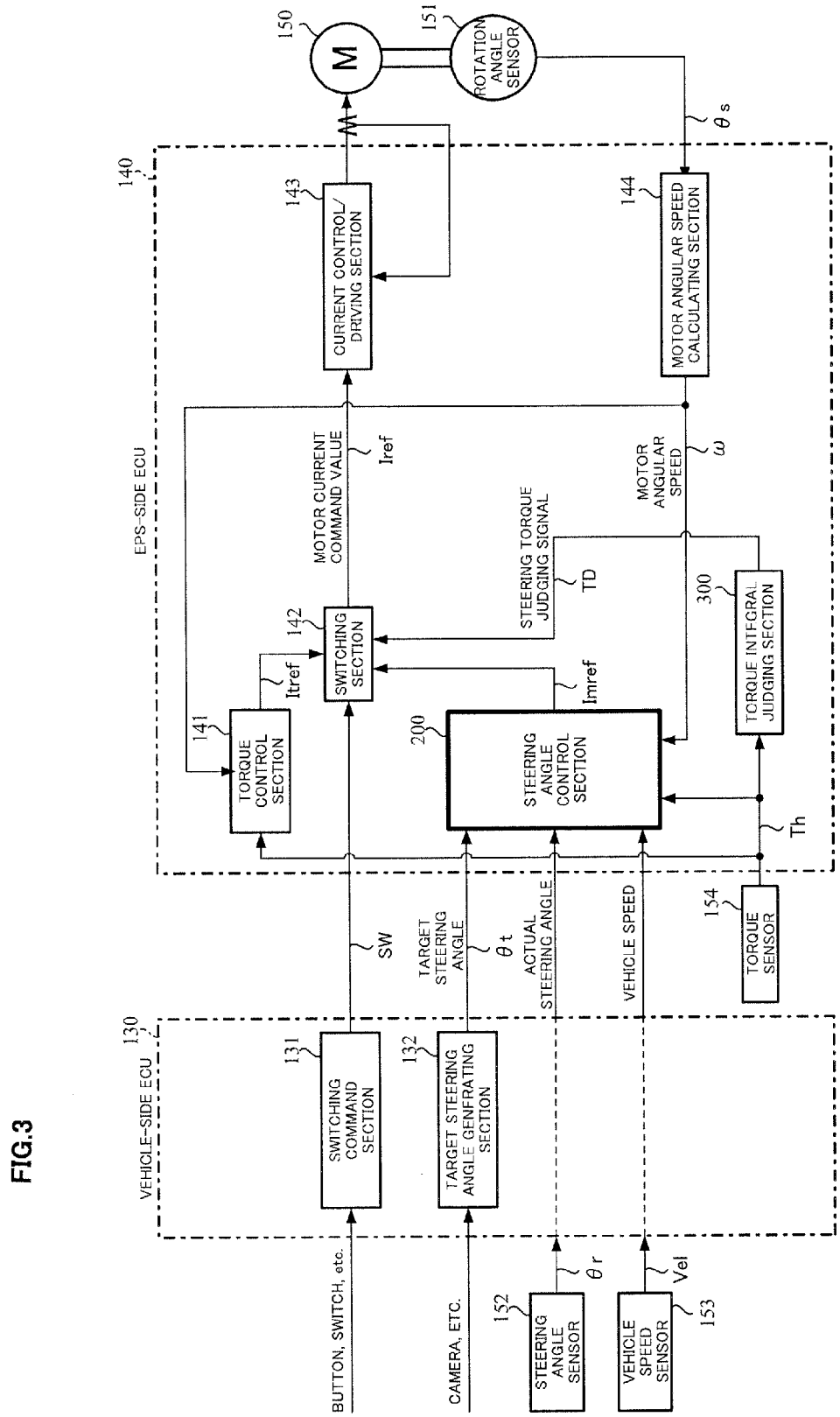
FIG. 3 is a block diagram showing a configuration example (a first embodiment) of the present invention.

FIG. 3 shows a configuration example (a first embodiment) of the present invention. A rotation angle sensor 151, such as a resolver and so on, for detecting a motor rotation angle θs is connected to a motor 150, and the motor 150 is driven and controlled through a vehicle-side ECU 130 and an electric power steering apparatus (EPS)-side ECU 140.

The vehicle-side ECU 130 comprises a switching command section 131 that outputs a switching command SW of either an automatic steering mode or a manual steering mode based on a button, a switch and so on to show a driver's intention, and a target steering angle generating section 132 that generates a target steering angle θt based on a signal from a camera (an image), a distance sensor and so on. Further, an actual steering angle θr detected by a steering angle sensor 152 which a column shaft is provided with and a vehicle speed Vel from a vehicle speed sensor 153 are inputted through the vehicle-side ECU 130 into a steering angle control section 200 within the EPS-side ECU 140. An output from the steering angle sensor 152 may be an estimated value of a steering angle estimated by the column shaft (including an intermediate shaft and a pinion shaft), a displacement of a rack of a rack and pinion, a wheel speed and so on. Further, it is also possible to receive the vehicle speed Vel from a CAN and so on.

The switching command section 131 outputs the switching command SW based on a signal for identifying whether to enter the automatic steering mode, for example a signal of a vehicle state by means of the button or the switch which a dashboard or a steering wheel area is provided with to show the driver's intention, a parking mode set in a shift and so on, and inputs the switching command SW into a switching section 142 within the EPS-side ECU 140. Further, the target steering angle generating section 132 generates the target steering angle θt based on data from the camera (the image), the distance sensor and so on by a well-known manner, and inputs the generated target steering angle θt into the steering angle control section 200 within the EPS-side ECU 140.

The EPS-side ECU 140 comprises a torque control section 141 that outputs a motor current command value Itref that is calculated based on a steering torque Th from a torque sensor 154 and a motor angular speed ω, the steering angle control section 200 that calculates and outputs a motor current command value Imref for an automatic control of a steering angle based on the target steering angle θt, the actual steering angle θr, the vehicle speed Vel, the steering torque Th and the motor angular speed ω, the switching section 142 that switches the motor current command value Itref and the motor current command value Imref by means of the switching command SW from the switching command section 131 or a steering torque judging signal TD and outputs a motor current command value Iref, a current control/driving section 143 that drives and controls the motor 150 based on the motor current command value Iref (Itref or Imref) from the switching section 142, a motor angular speed calculating section 144 that calculates the motor angular speed ω based on the motor rotation angle θs from the rotation angle sensor 151, and a torque integral judging section 300 that outputs the steering torque judging signal TD based on the steering torque Th. The steering angle control section 200 calculates the motor current command value Imref to get the actual steering angle θr close to the target steering angle θt.

The switching section 142 switches a torque control mode (the manual steering mode) by the torque control section 141 and the automatic steering mode by the steering angle control section 200 based on the switching command SW from the switching command section 131 within the vehicle-side ECU 130 or the steering torque judging signal TD from the torque integral judging section 300, outputs the motor current command value Itref as the motor current command value Iref in the manual steering mode, and outputs the motor current command value Imref as the motor current command value Iref in the automatic steering mode. Further, the current control/driving section 143 comprises a PI current control section, a PWM control section, an inverter and so on.

Figure 4:
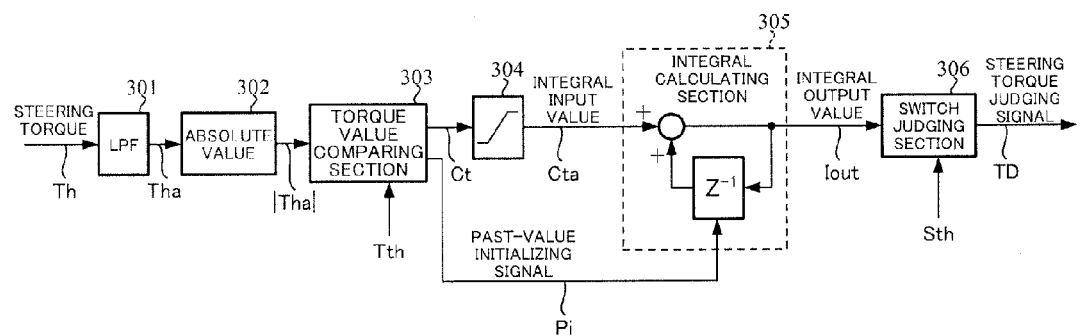
FIG. 4 is a block diagram showing a configuration example of a torque integral judging section.

The torque integral judging section 300 is configured as shown in FIG. 4, and comprises an LPF (Low-Pass Filter) 301 for eliminating a noise of the steering torque Th, an absolute value section 302 that calculates an absolute value of a steering torque Tha outputted from the LPF 301, a torque value comparing section 303 that compares an absolute value of the steering torque Tha with a predetermined torque threshold Tth and outputs an output signal Ct or a past-value initializing signal Pi, a limiter 304 that limits an upper and a lower limits of the output signal Ct so as not to input an excessive signal, an integral calculating section 305 that integrates an integral input value Cta from the limiter 304, and a switch judging section 306 that compares an integral output value Iout integrated by the integral calculating section 305 with a predetermined integral threshold Sth and outputs the steering torque judging signal TD.

The LPF 301 for eliminating the noise of the steering torque Th is provided in order to avoid the steering torque exceeding a predetermined value temporarily because of an inertial torque of a steering wheel when a tire collides with a curb, a stone and so on, or switching the automatic steering control or making it hard to switch the automatic steering control when the steering torque Th is no larger than the predetermined value. The torque value comparing section 303 compares the absolute value |Tha| of the steering torque Tha with the torque threshold Tth, performs an integral operation when the absolute value |Tha| is equal to or larger than the torque threshold Tth, and initializes the integral value to 0 when the absolute value |Tha| is smaller than the torque threshold Tth. That is, the torque value comparing section 303 performs the following operation.

TABLE 1 the output signal Ct = |Tha| when |Tha| ≥ Tth,
the output signal Ct = 0 and the past-value initializing signal Pi is outputted when |Tha| < Tth.

A past-value holding section ($Z^{-1}$) within the integral calculating section 305 is initialized to 0 when the past-value initializing signal Pi is outputted from the torque value comparing section 303. Further, the switch judging section 306 compares the integral output value Iout with the integral threshold Sth, a switching condition is established when the integral output value Iout is equal to or larger than the integral threshold Sth, and the switch judging section 306 switches from the automatic steering mode to the manual steering mode. The switch judging section 306 judges that the switching condition is not established when the integral output value Iout is smaller than the integral threshold Sth, and continues the automatic steering mode. That is, the switch judging section 306 performs the following operation.

TABLE 2 the switching condition is established when Iout ≥ Sth,
the switching condition is not established when Iout < Sth.

Providing the absolute value section 302 enables the judgment only by a magnitude. Therefore, it is possible to judge by comparison with the single torque threshold Tth. Further, as a configuration, it is also possible to combine the absolute value section 302 and the torque value comparing section 303, and judge the absolute value by an internal process of the torque value comparing section 303. It is also possible to calculate the absolute value after the integral calculation because the absolute value section is unnecessary in the case of setting positive and negative values of the torque threshold Tth.

Figure 5:
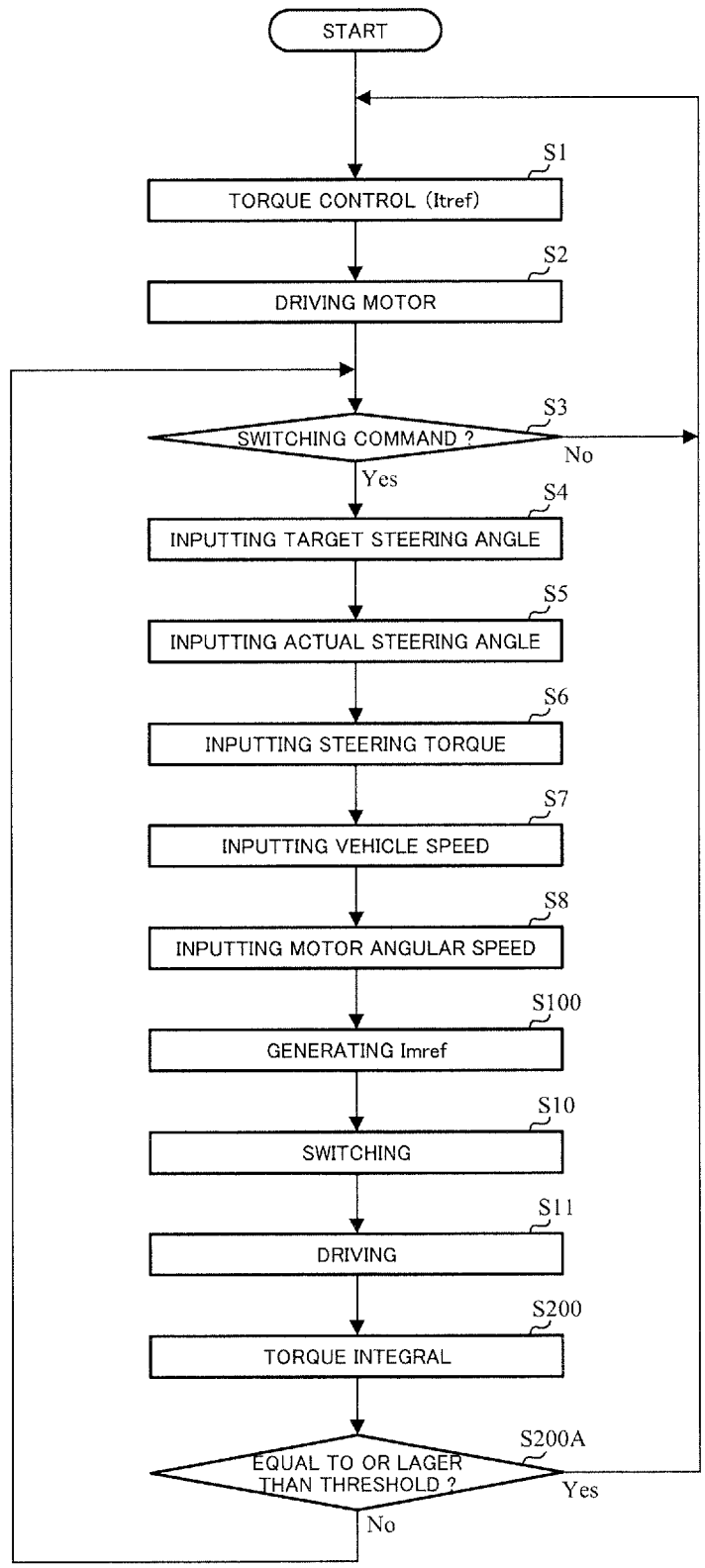
FIG. 5 is a flowchart showing an operating example (a first embodiment) of the present invention.

In such a configuration, that whole operating example (a first embodiment) will be described with reference to the flowchart of FIG. 5.

When an operation of a steering system starts, the torque control (the manual steering mode) by the torque control section 141 is performed (Step S1), and the motor 150 is driven by the current control/driving section 143 using the motor current command value Itref (Step S2). The above operations are repeated until the switching command SW is outputted from the switching command section 131 (Step S3).

When the switching command SW is outputted from the switching command section 131 by switching to the automatic steering mode, the target steering angle θt is inputted from the target steering angle generating section 132 (Step S4), the actual steering angle θr is inputted from the steering angle sensor 152 (Step S5), the steering torque Th is inputted from the torque sensor 154 (Step S6), the vehicle speed Vel is inputted from the vehicle speed sensor 153 (Step S7), and the motor angular speed ω from the motor angular speed calculating section 144 (Step S8) to the steering angle control section 200. In the steering angle control section 200, the motor current command value Imref is generated (Step S100). Moreover, the input order of the target steering angle θt, the actual steering angle θr, the steering torque Th and the motor angular speed ω is arbitrary.

Thereafter, the switching section 142 is switched by the switching command SW from the switching command section 131 so as to become the automatic steering mode (Step S10), and the motor 150 is driven by the current control/driving section 143 using the motor current command value Imref from the steering angle control section 200 (Step S11).

In such the automatic steering mode, the torque integral judging section 300 performs the torque integral operation to the steering torque Th (Step S200), and judges whether an integrated torque integral value (the integral output value Iout) is equal to or larger than the predetermined threshold (Step S200A). When the torque integral value is equal to or larger than the threshold, the steering torque judging signal TD is outputted from the torque integral judging section 300, the switching section 142 is switched, the operation returns to the above Step S1, and becomes the manual steering mode. When the torque integral value is smaller than the threshold, the operation returns to the above Step S3, and the above operations (the automatic steering mode) are repeated.

Figure 6:
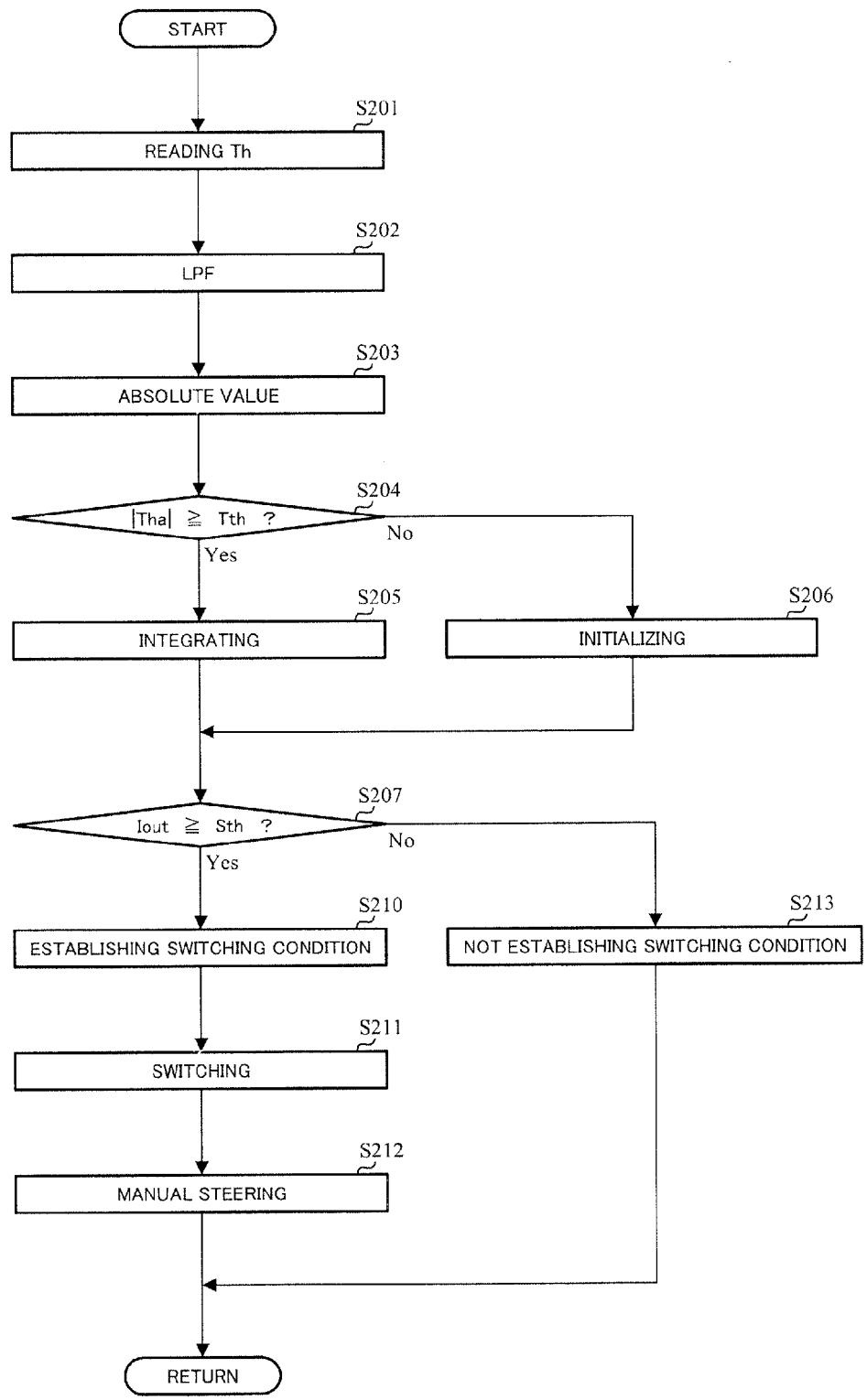
FIG. 6 is a flowchart showing an operating example of the torque integral judging section.

Next, the operation of the torque integral judging section 300 (Steps S200 and S200A in FIG. 5) will be described with reference to the flowchart of FIG. 6 in detail.

The torque integral judging section 300 reads the steering torque Th (Step S201) that has already inputted (Step S6), performs the noise elimination in the LPF 301 (Step S202), and calculates the absolute value |Tha| of the steering torque Tha from the LPF 301 in the absolute value section 302 (Step S203). The torque threshold Tth is previously inputted into the torque value comparing section 303, the torque value comparing section 303 judges whether the absolute value |Tha| is equal to or larger than the torque threshold Tth (Step S204), inputs the output signal Ct as the absolute value |Tha| into the integral calculating section 305 when the absolute value |Tha| is equal to or larger than the torque threshold Tth, and the torque integral judging section 300 performs the integral operation in the integral calculating section 305 (Step S205). Further, when the absolute value |Tha| is smaller than the torque threshold Tth, the torque value comparing section 303 makes the output signal Ct 0 so as not to perform the integral operation, and at the same time initializes the integral calculating section 305 by outputting the past-value initializing signal Pi (Step S206). The initialization is performed by resetting the past-value holding section ($Z^{-1}$) within the integral calculating section 305 to 0.

The integral output value Iout from the integral calculating section 305 is inputted into the switch judging section 306, and the switch judging section 306 judges whether the integral output value Iout is equal to or larger than the integral threshold Sth (Step S207). When the integral output value Iout is equal to or larger than the integral threshold Sth, the switching condition is established (Step S210), the switch judging section 306 switches the switching section 142 by means of the steering torque judging signal TD (Step S211), and switches from the automatic steering mode to the manual steering mode (Step S212). Further, when the integral output value Iout is smaller than the integral threshold Sth, the switching condition is not established, so that the switching is not performed (Step S213).

Figure 7:
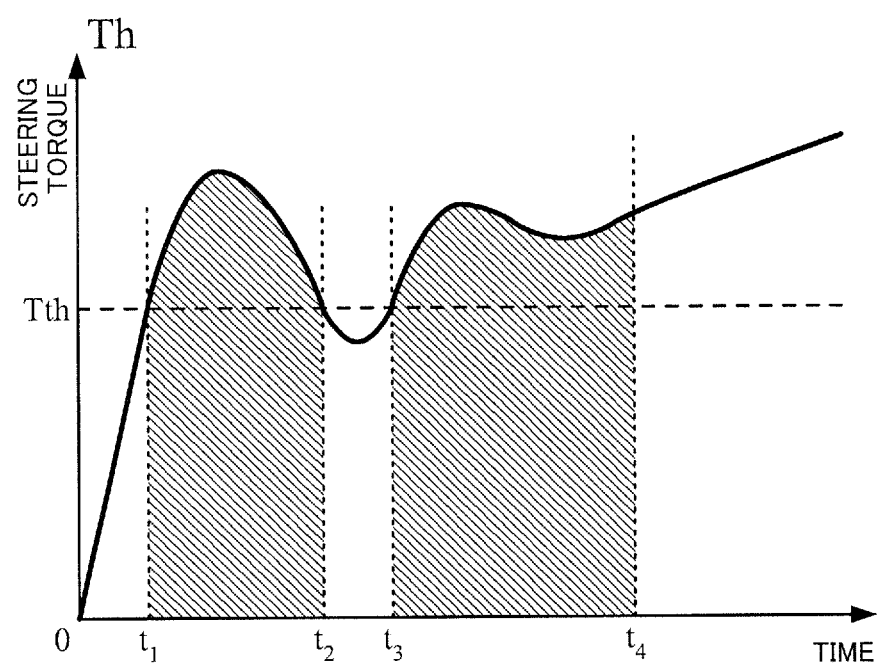
FIG. 7 is a timing chart showing an operating example of a steering torque and an integral.

FIG. 7 shows an example of time change of the steering torque Th (Tha) to the torque threshold Tth in relation to the integral operation. The integration is not performed because the steering torque Th is smaller than the torque threshold Tth from a start point to a time point $t_1$. The integration is performed because the steering torque Th is equal to or larger than the torque threshold Tth between the time point $t_1$ and a time point $t_2$, but the switching condition is not established because the integral value is smaller than the integral threshold Sth. Then, the integration is not performed because the steering torque Th is smaller than the torque threshold Tth between the time point $t_2$ and a time point $t_3$, and the integration is performed because the steering torque Th is equal to or larger than the torque threshold Tth after the time point $t_3$. At a time point $t_4$, the integral value becomes equal to or larger than the predetermined value (the integral threshold Sth), and a situation where the switching condition is established is shown. In other words, shaded parts shown in FIG. 7 are integral domains (areas), where an example is shown that the switching condition is not established because the integral value is smaller than the integral threshold Sth at the time point $t_2$, and the switching condition is established because the integral value is equal to or larger than the integral threshold Sth at the time point $t_4$.

Figure 8:
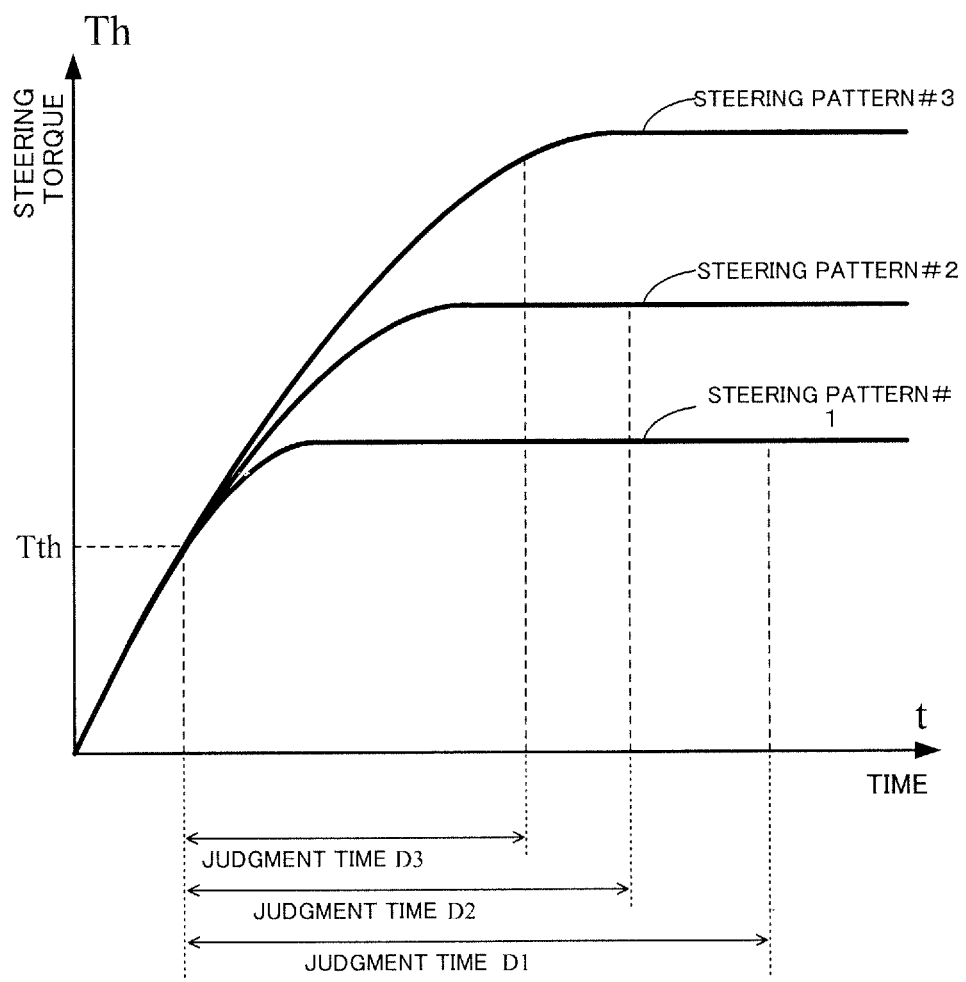
FIG. 8 is a characteristic diagram showing a relation between the steering torque and a judgment time.

FIG. 8 shows a relation between steering patterns #1~#3 of the steering torque Th and judgment times D1~D3, and the torque threshold Tth is given. Then, regarding the steering patterns #1~#3, all of the timing when the steering torque Th runs up to the torque threshold Tth are identical, after that time every steering torque Th becomes larger than the torque threshold Tth, and the integral calculation starts when the steering torque Th runs up to the torque threshold Tth. From FIG. 8, it is found out that the larger the steering torque Th, the shorter the judgment time. This is because the larger the steering torque Th, the larger a change rate of the integration, and the integral value runs up to the integral threshold Sth early.

Moreover, it is also possible to change the motor current command value gradually using a fading gain in the case of switching the steering mode in the switching section 142.

Figure 9:
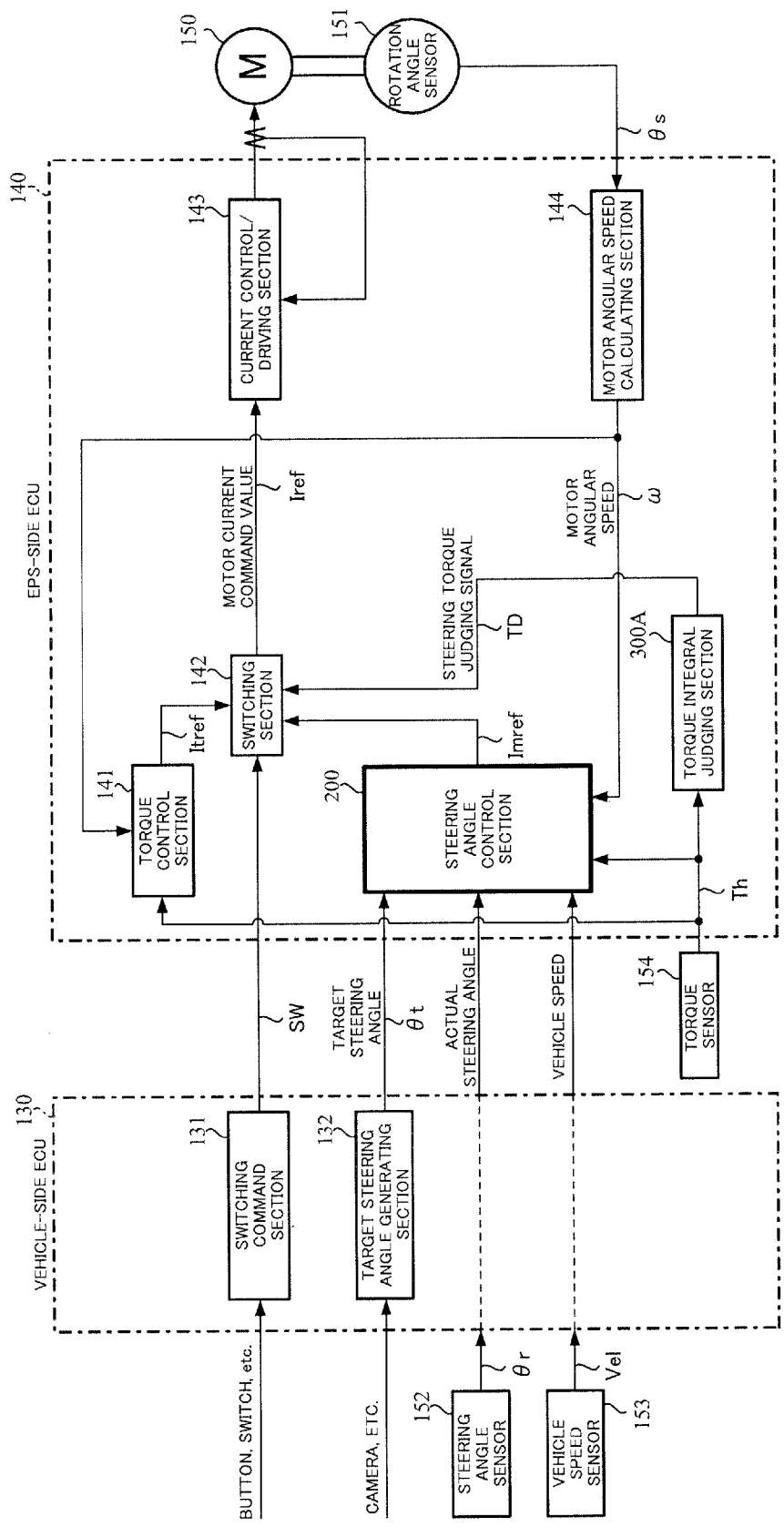
FIG. 9 is a block diagram showing a configuration example (a second embodiment) of the present invention.

FIG. 9 shows a configuration example (a second embodiment) of the present invention as corresponding to FIG. 3, and is totally same as the first embodiment shown in FIG. 3 except a torque integral judging section 300A. The torque integral judging section 300A outputs the steering torque judging signal TD based on the steering torque Th as well as the first embodiment.

Figure 10:
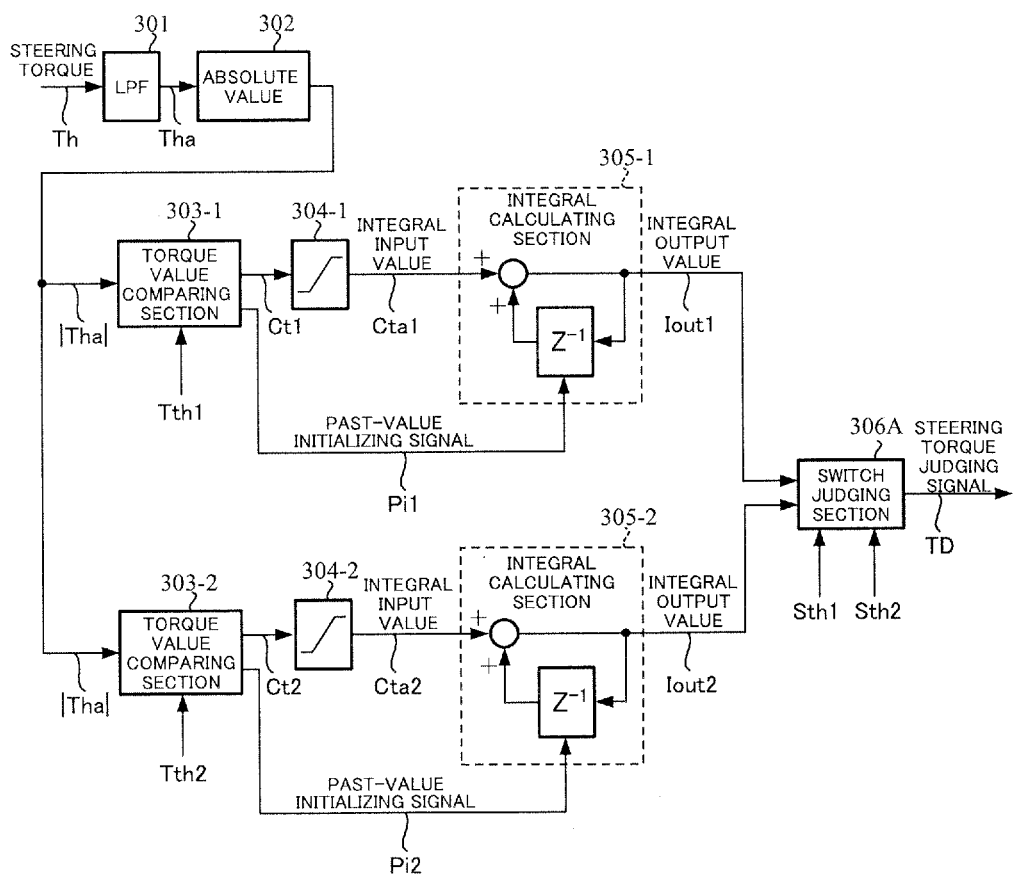
FIG. 10 is a block diagram showing a configuration example of the torque integral judging section.

The torque integral judging section 300A in the second embodiment is configured as shown in FIG. 10, comprises the LPF (Low-Pass Filter) 301 for eliminating the noise of the steering torque Th, the absolute value section 302 that calculates the absolute value of the steering torque Tha outputted from the LPF 301 as well as the first embodiment, and a judging part is comprised of two series in the present second embodiment.

That is, the first series comprises a torque value comparing section 303-1 that compares the absolute value |Tha| of the steering torque Tha with a predetermined torque threshold Tth1 and outputs an output signal Ct1 or a past-value initializing signal Pi1, a limiter 304-1 that limits an upper and a lower limits of the output signal Ct1 so as not to input an excessive signal, an integral calculating section 305-1 that integrates an integral input value Cta1 from the limiter 304-1, and a switch judging section 306A that inputs an integral output value Iout1 integrated by the integral calculating section 305-1, compares the integral output value Iout1 with a predetermined integral threshold Sth1 and outputs the steering torque judging signal TD. Similarly, the second series comprises a torque value comparing section 303-2 that compares the absolute value |Tha| of the steering torque Tha with a predetermined torque threshold Tth2 (>Tth1) and outputs an output signal Ct2 or a past-value initializing signal Pi2, a limiter 304-2 that limits an upper and a lower limits of the output signal Ct2 so as not to input an excessive signal, an integral calculating section 305-2 that integrates an integral input value Cta2 from the limiter 304-2, and the switch judging section 306A that inputs an integral output value Iout2 integrated by the integral calculating section 305-2, compares the integral output value Iout2 with a predetermined integral threshold Sth2 (<Sth1) and outputs the steering torque judging signal TD. The switch judging section 306A may be common between the first series and the second series or be individual.

The torque value comparing section 303-1 compares the absolute value |Tha| of the steering torque Tha with the torque threshold Tth1, performs an integral operation in the integral calculating section 305-1 through the limiter 304-1 when the absolute value |Tha| is equal to or larger than the torque threshold Tth1, and initializes the integral value to 0 when the absolute value |Tha| is smaller than the torque threshold Tth1. That is, the torque value comparing section 303-1 performs the following operation.

TABLE 3 the output signal Ct1 = |Tha| when |Tha| ≥ Tth1,
the output signal Ct1 = 0 and the past-value initializing signal Pi1 is outputted when |Tha| < Tth1.

Similarly, the torque value comparing section 303-2 compares the absolute value |Tha| of the steering torque Tha with the torque threshold Tth2, performs an integral operation in the integral calculating section 305-2 through the limiter 304-2 when the absolute value |Tha| is equal to or larger than the torque threshold Tth2, and initializes the integral value to 0 when the absolute value |Tha| is smaller than the torque threshold Tth2. That is, the torque value comparing section 303-2 performs the following operation.

TABLE 4 the output signal Ct2 = |Tha| when |Tha| ≥ Tth2,
the output signal Ct2 = 0 and the past-value initializing signal Pi2 is outputted when |Tha| < Tth2.

A past-value holding section ($Z^{-1}$) within the integral calculating section 305-1 is initialized to 0 when the past-value initializing signal Pi1 is outputted from the torque value comparing section 303-1, and similarly a past-value holding section ($Z^{-1}$) within the integral calculating section 305-2 is initialized to 0 when the past-value initializing signal Pi2 is outputted from the torque value comparing section 303-2.

The switch judging section 306A compares the integral output value Iout1 with the integral threshold Sth1, a switching condition is established when the integral output value Iout1 is equal to or larger than the integral threshold Sth1, and the switch judging section 306A switches from the automatic steering mode to the manual steering mode. The switch judging section 306A judges that the switching condition is not established when the integral output value Iout1 is smaller than the integral threshold Sth1, and continues the automatic steering mode. Further, the switch judging section 306A compares the integral output value Iout2 with the integral threshold Sth2, a switching condition is established when the integral output value Iout2 is equal to or larger than the integral threshold Sth2, and the switch judging section 306A switches from the automatic steering mode to the manual steering mode. The switch judging section 306A judges that the switching condition is not established when the integral output value Iout2 is smaller than the integral threshold Sth2, and continues the automatic steering mode.

That is, the switch judging section 306A performs the following operation.

TABLE 5 the switching condition is established when Iout1 ≥ Sth1 or Iout2 ≥ Sth2,
the switching condition is not established when Iout1 < Sth1 and Iout2 < Sth2.

Providing the absolute value section 302 enables the judgment only by a magnitude. Further, as a configuration, it is also possible to combine the absolute value section 302 and the torque value comparing section 303-1 and 303-2, and judge the absolute value by an internal process of the torque value comparing section 303-1 and 303-2. It is also possible to calculate the absolute value after the integral calculation because the absolute value section is unnecessary in the case of setting positive and negative values of the torque threshold Tth1 and Tth2.

Figure 11:
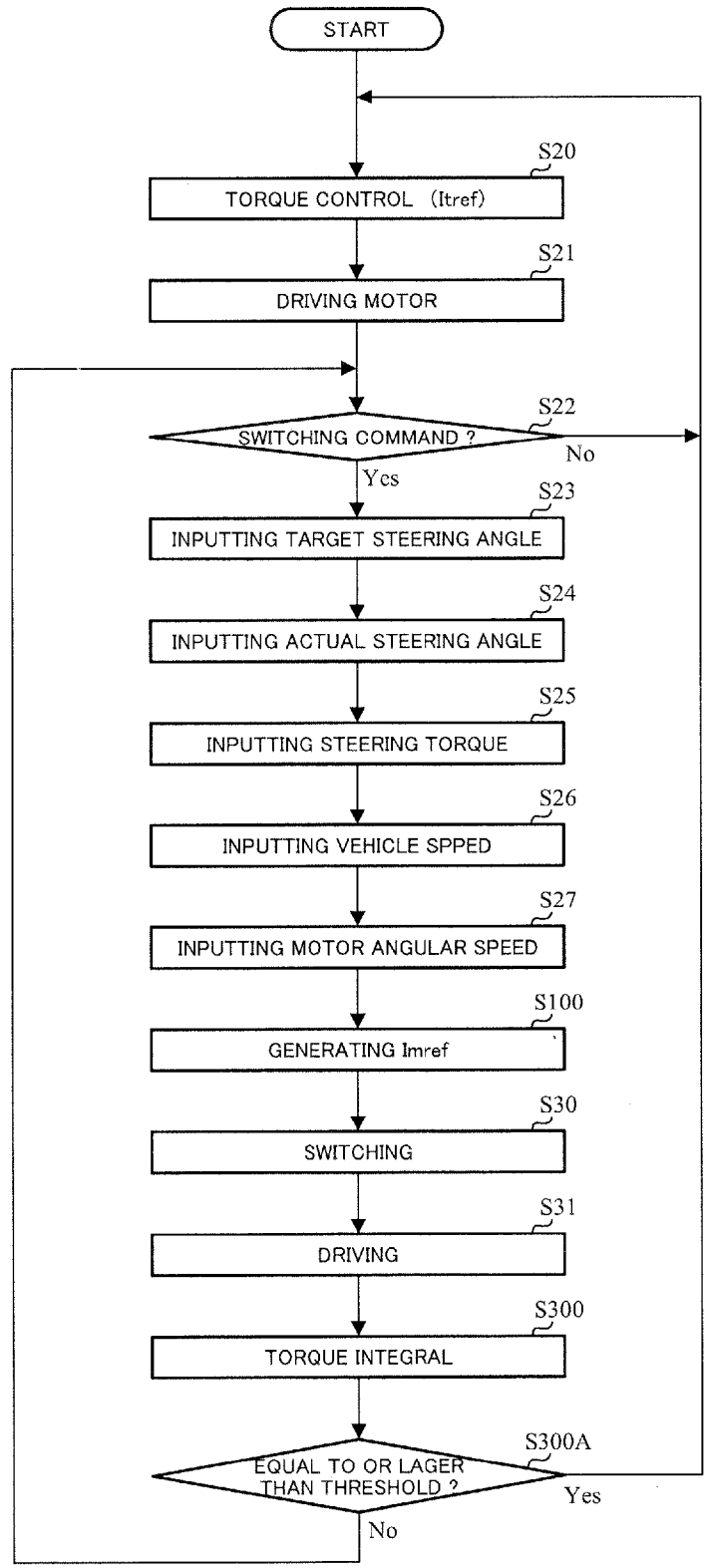
FIG. 11 is a flowchart showing an operating example (a second embodiment) of the present invention.

In such a configuration, that whole operating example (a second embodiment) will be described with reference to the flowchart of FIG. 11.

When an operation of a steering system starts, the torque control (the manual steering mode) by the torque control section 141 is performed (Step S20), the motor 150 is driven by the current control/driving section 143 using the motor current command value Itref (Step S21). The above operations are repeated until the switching command SW is outputted from the switching command section 131 (Step S22).

When the switching command SW is outputted from the switching command section 131 by switching to the automatic steering mode, the target steering angle θt is inputted from the target steering angle generating section 132 (Step S23), the actual steering angle θr is inputted from the steering angle sensor 152 (Step S24), the steering torque Th is inputted from the torque sensor 154 (Step S25), the vehicle speed Vel is inputted from the vehicle speed sensor 153 (Step S26), and the motor angular speed ω from the motor angular speed calculating section 144 (Step S27) to the steering angle control section 200. In the steering angle control section 200, the motor current command value Imref is generated (Step S100). Moreover, the input order of the target steering angle θt, the actual steering angle θr, the steering torque Th and the motor angular speed ω is arbitrary.

Thereafter, the switching section 142 is switched by the switching command SW from the switching command section 131 so as to become the automatic steering mode (Step S30), and the motor 150 is driven by the current control/driving section 143 using the motor current command value Imref from the steering angle control section 200 (Step S31).

In such the automatic steering mode, the torque integral judging section 300A performs the torque integral operation to the steering torque Th (Step S300), and judges whether integrated torque integral values (the integral output values Iout1 and Iout2) are equal to or larger than predetermined thresholds (Sth1 and Sth2) (Step S300A). The switching condition is established when the torque integral value Iout1 or Iout2 is equal to or larger than the threshold Sth1 or Sth2, the steering torque judging signal TD is outputted from the torque integral judging section 300, the switching section 142 is switched, the operation returns to the above Step S20, and becomes the manual steering mode. The switching condition is not established when the torque integral values Iout1 and Iout2 are smaller than the thresholds Sth1 and Sth2, the operation returns to the above Step S22, and the above operations (the automatic steering mode) are repeated.

Figure 12:
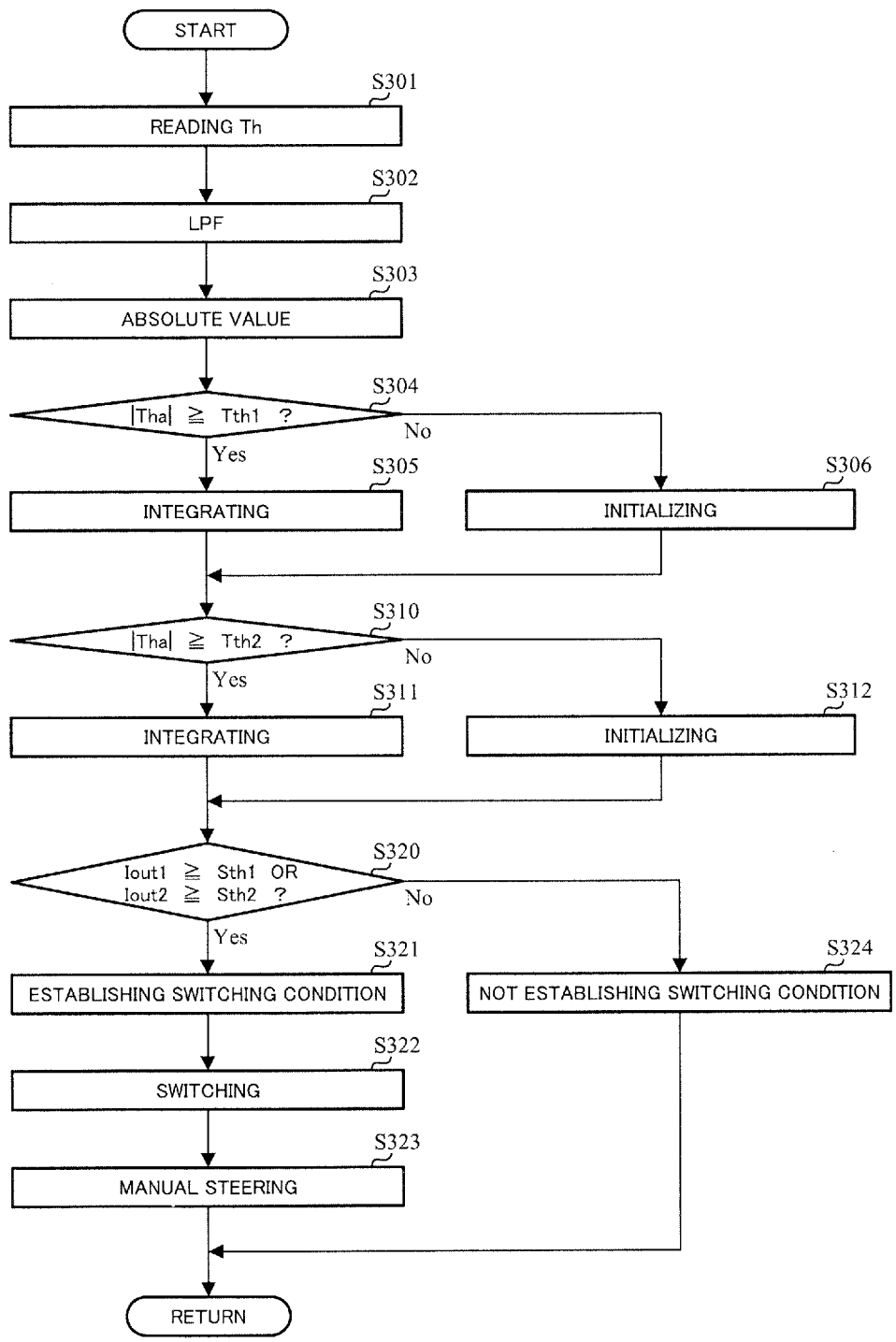
FIG. 12 is a flowchart showing an operating example of the torque integral judging section.

Next, the operation of the torque integral judging section 300A (Steps S300 and S300A in FIG. 11) will be described with reference to the flowchart of FIG. 12 in detail.

The torque integral judging section 300A reads the steering torque Th (Step S301) that has already inputted (Step S25), performs the noise elimination in the LPF 301 (Step S302), and calculates the absolute value |Tha| of the steering torque Tha from the LPF 301 in the absolute value section 302 (Step S303). The torque threshold Tth1 is previously inputted into the torque value comparing section 303-1, the torque value comparing section 303-1 judges whether the absolute value |Tha| is equal to or larger than the torque threshold Tth1 (Step S304), inputs the output signal Ct1 as the absolute value |Tha| into the integral calculating section 305-1 through the limiter 304-1 when the absolute value |Tha| is equal to or larger than the torque threshold Tth1, and the torque integral judging section 300A performs the integral operation in the integral calculating section 305-1 (Step S305). Further, when the absolute value |Tha| is smaller than the torque threshold Tth1, the torque value comparing section 303-1 makes the output signal Ct1 0 so as not to perform the integral operation, and at the same time initializes the integral calculating section 305-1 by outputting the past-value initializing signal Pi1 (Step S306). The initialization is performed by resetting the past-value holding section ($Z^{-1}$) within the integral calculating section 305-1 to 0.

Further, the torque threshold Tth2 (>Tth1) is previously inputted into the torque value comparing section 303-2, the torque value comparing section 303-2 judges whether the absolute value |Tha| is equal to or larger than the torque threshold Tth2 (Step S310), inputs the output signal Ct2 as the absolute value |Tha| into the integral calculating section 305-2 through the limiter 304-2 when the absolute value |Tha| is equal to or larger than the torque threshold Tth2, and the torque integral judging section 300A performs the integral operation in the integral calculating section 305-2 (Step S311). Further, when the absolute value |Tha| is smaller than the torque threshold Tth2, the torque value comparing section 303-2 makes the output signal Ct2 0 so as not to perform the integral operation, and at the same time initializes the integral calculating section 305-2 by outputting the past-value initializing signal Pi2 (Step S312). The initialization is performed by resetting the past-value holding section ($Z^{-1}$) within the integral calculating section 305-2 to 0.

The integral output value Iout1 from the integral calculating section 305-1 is inputted into the switch judging section 306A, the switch judging section 306A judges whether the integral output value Iout1 is equal to or larger than the integral threshold Sth1, at the same time the integral output value Iout2 from the integral calculating section 305-2 is also inputted into the switch judging section 306A, and the switch judging section 306A judges whether the integral output value Iout2 is equal to or larger than the integral threshold Sth2 (Step S320). When the integral output value Iout1 is equal to or larger than the integral threshold Sth1 or the integral output value Iout2 is equal to or larger than the integral threshold Sth2, the switching condition is established (Step S321), the switch judging section 306A switches the switching section 142 by means of the steering torque judging signal TD (Step S322), and switches from the automatic steering mode to the manual steering mode (Step S323). Further, when the integral output values Iout1 and Iout2 are in cases other than the above with the integral thresholds Sth1 and Sth2, the switching condition is not established, so that the switching is not performed (Step S324).

Figure 13:
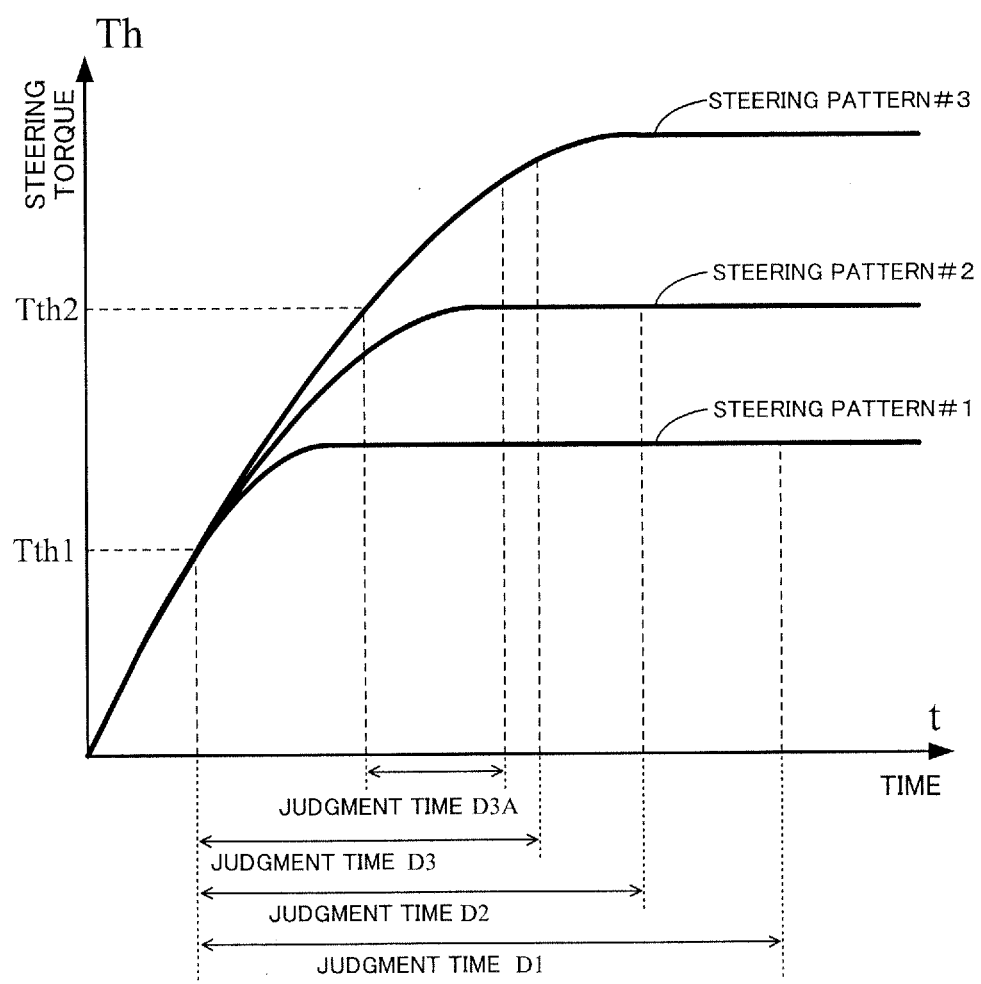
FIG. 13 is a diagram for describing an operation of the present invention.

FIG. 13 shows a relation between steering patterns #1~#3 of the steering torque Th and judgment times D1~D3, and the torque thresholds Tth1 and Tth2 (>Tth1) are given. For example, it is desirable to make the judgment time as short as possible when emergency avoidance is performed by a driver. The torque threshold Tth2 can be made larger than the torque threshold Tth1 and the integral threshold Sth2 can be made smaller than the integral threshold Sth1 in order to make a detection time after detecting a large steering torque short. The judgment times D1~D3 shown in FIG. 13 are results of the torque threshold Tth1 and the integral threshold Sth1 to the steering pattern #1~#3 respectively. It is assumed that all of the timing when the steering torque Th runs up to the torque threshold Tth1 are identical and every steering torque Th after that time is larger than the torque threshold Tth1. It is found out that the larger the steering torque Th, the shorter the judgment time. This is because the larger the steering torque Th, the larger a change rate of the integration, and the integral value runs up to the integral threshold Sth1 early.

Then, a judgment time D3A is a result of the torque threshold Tth2 and the integral threshold Sth2. It is assumed that the steering torques Th of the steering patterns #1 and #2 are small to the torque threshold Tth2 and one of the steering pattern #3 only becomes large. It is possible to make a judgment time after the steering torque Th exceeds the torque threshold Tth2 shorter than in the case of the torque threshold Tth1 and the integral threshold Sth1. It is possible to make the timing of the judgment early by setting the torque threshold Tth2 and the integral threshold Sth2.

Figure 14:
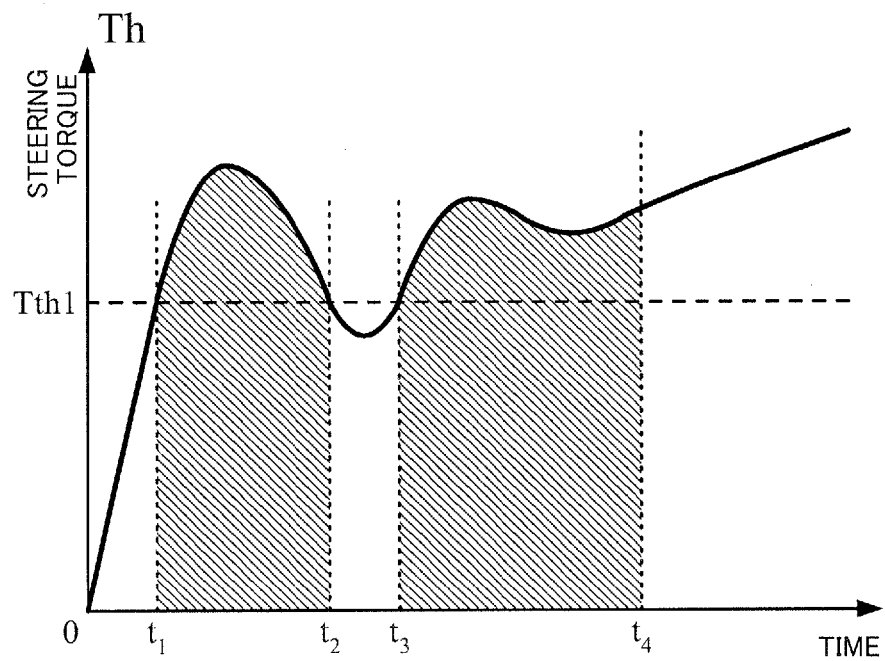
FIGS. 14(A) and (B) are timing charts showing an operating example of the steering torque and the integral compared with each two thresholds.
Figure 14:
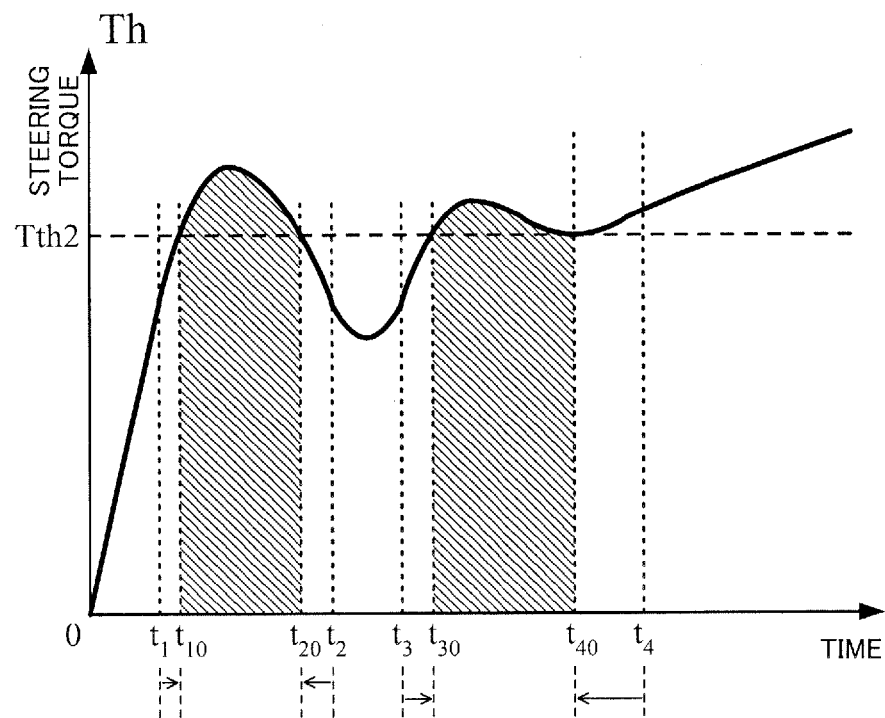

FIG. 14(A) shows an example of time change of the steering torque Th (Tha) to the torque threshold Tth1 in relation to the integral operation, and FIG. 14(B) shows an example of time change of the steering torque Th (Tha) to the torque threshold Tth2 in relation to the integral operation.

In the example of FIG. 14(A), the integration is not performed because the steering torque Th is smaller than the torque threshold Tth1 from a start point to a time point $t_1$. The integration is performed because the steering torque Th is equal to or larger than the torque threshold Tth1 between the time point $t_1$ and a time point $t_2$, but the switching condition is not established because the integral value is smaller than the integral threshold Sth1. Then, the integration is not performed because the steering torque Th is smaller than the torque threshold Tth1 between the time point $t_2$ and a time point $t_3$, and the integration is performed because the steering torque Th is equal to or larger than the torque threshold Tth1 after the time point $t_3$. At a time point $t_4$, the integral value becomes equal to or larger than the predetermined value (the integral threshold Sth1), and a situation where the switching condition is established is shown. In other words, shaded parts shown in FIG. 14(A) are integral domains (areas), where an example is shown that the switching condition is not established because the integral value is smaller than the integral threshold Sth1 at the time point $t_2$, and the switching condition is established because the integral value is equal to or larger than the integral threshold Sth1 at the time point $t_4$.

In the example of FIG. 14(B), the torque threshold Tth2 is set larger than the torque threshold Tth1, and the integration is not performed because the steering torque Th is smaller than the torque threshold Tth2 from a start point to a time point $t_{10}$. The integration is performed because the steering torque Th is equal to or larger than the torque threshold Tth2 between the time point $t_{10}$ and a time point $t_{20}$, but the switching condition is not established because the integral value is smaller than the integral threshold Sth2. Then, the integration is not performed because the steering torque Th is smaller than the torque threshold Tth2 between the time point $t_{20}$ and a time point $t_{30}$, and the integration is performed because the steering torque Th is equal to or larger than the torque threshold Tth2 after the time point $t_{30}$. At a time point $t_{40}$, the integral value becomes equal to or larger than the predetermined value (the integral threshold Sth2), and a situation where the switching condition is established is shown. In other words, shaded parts shown in FIG. 14(B) are integral domains (areas), where an example is shown that the switching condition is not established because the integral value is smaller than the integral threshold Sth2 at the time point $t_{20}$, and the switching condition is established because the integral value is equal to or larger than the integral threshold Sth2 at the time point $t_{40}$.

Moreover, it is also possible to change the motor current command value gradually using a fading gain in the case of switching the steering mode in the switching section 142. Further, although the above is a description about the example of two series set two torque thresholds and corresponding two integral thresholds, it is also possible to operate in more than three series set more than three thresholds respectively.

EXPLANATION OF REFERENCE NUMERALS 1 steering handle (steering wheel)
2 column shaft (steering shaft)
10,154 torque sensor
12,153 vehicle speed sensor
13 battery
20,150 motor
21 motor driving section
100 control unit (ECU)
110 torque system control section
120 motor system control section
151 rotation angle sensor
152 steering angle sensor
130 vehicle-side ECU
131 switching command section
132 target steering angle generating section
140 EPS-side ECU
141 torque control section
142 switching section
143 current control/driving section
144 motor angular speed calculating section
300,300A torque integral judging section
303,303-1,303-2 torque value comparing section
305,305-1,305-2 integral calculating section
306,306A switch judging section

The invention claimed is:

1. An electric power steering apparatus that calculates a motor current command value 1 based on a steering torque and a vehicle speed, drives a motor based on said motor current command value 1 so as to perform an assist control of a steering system, and has a function for switching an automatic steering mode and a manual steering mode, comprising:
 a steering angle control section that calculates a motor current command value 2 to get an actual steering angle close to a target steering angle;
 a torque integral judging section that outputs a steering torque judging signal by integrating said steering torque, which is compared with a predetermined threshold; and
 a switching section that inputs said motor current command value 1 and said motor current command value 2, and is switched in accordance with a switching signal or said steering torque judging signal;
 wherein said torque integral judging section comprises a torque value comparing section that compares an absolute value of said steering torque with a torque threshold so as to output a predetermined signal, an integral calculating section that integrates said predetermined signal, and a switch judging section that compares an integral value from said integral calculating section with an integral threshold so as to output said steering torque judging signal, and initializes said integral calculating section in case said absolute value of said steering torque is smaller than said torque threshold; and
 wherein said switching section is switched depending on a switching command of said automatic steering mode and said manual steering mode or said steering torque judging signal.

2. The electric power steering apparatus according to claim 1, wherein
 said torque integral judging section comprises an LPF in a front stage of said torque value comparing section.

3. The electric power steering apparatus according to claim 1, wherein
 said torque value comparing section includes a function for outputting said absolute value when said absolute value is equal to or larger than said torque threshold, and outputting 0 and at the same time outputting a past-value initializing signal to initialize said integral calculating section when said absolute value is smaller than said torque threshold.

4. The electric power steering apparatus according to claim 1, wherein
 said switch judging section includes a function for outputting said steering torque judging signal when said integral value is equal to or larger than said integral threshold, and not outputting said steering torque judging signal when said integral value is smaller than said integral threshold.

5. The electric power steering apparatus according to claim 3, wherein
 said switch judging section includes a function for outputting said steering torque judging signal when said integral value is equal to or larger than said integral threshold, and not outputting said steering torque judging signal when said integral value is smaller than said integral threshold.

6. The electric power steering apparatus according to claim 1, wherein
 said switching section is switched in accordance with said steering torque judging signal so as to switch to said manual steering mode when said absolute value is equal to or larger than said torque threshold and said integral value becomes equal to or larger than said integral threshold in said automatic steering mode.

7. The electric power steering apparatus according to claim 3, wherein
 said switching section is switched in accordance with said steering torque judging signal so as to switch to said manual steering mode when said absolute value is equal to or larger than said torque threshold and said integral value becomes equal to or larger than said integral threshold in said automatic steering mode.

8. The electric power steering apparatus according to claim 4, wherein
said switching section is switched in accordance with said steering torque judging signal so as to switch to said manual steering mode when said absolute value is equal to or larger than said torque threshold and said integral value becomes equal to or larger than said integral threshold in said automatic steering mode.

9. The electric power steering apparatus according to claim 5, wherein
said switching section is switched in accordance with said steering torque judging signal so as to switch to said manual steering mode when said absolute value is equal to or larger than said torque threshold and said integral value becomes equal to or larger than said integral threshold in said automatic steering mode.

10. An electric power steering apparatus that calculates a motor current command value 1 based on a steering torque and a vehicle speed, drives a motor based on said motor current command value 1 so as to perform an assist control of a steering system, and has a function for switching an automatic steering mode and a manual steering mode, comprising:
a steering angle control section that calculates a motor current command value 2 to get an actual steering angle close to a target steering angle;
a torque integral judging section that outputs a steering torque judging signal by integrating said steering torque, which is compared with a predetermined threshold; and
a switching section that inputs said motor current command value 1 and said motor current command value 2, and is switched in accordance with a switching signal or said steering torque judging signal;
wherein said torque integral judging section comprises plural torque value comparing sections that compare an absolute value of said steering torque with plural torque thresholds so as to output each predetermined signal, plural integral calculating sections that integrate said each predetermined signal, and a switch judging section that compares each integral value from said plural integral calculating sections with corresponding plural integral thresholds so as to output said steering torque judging signal, and initializes said plural integral calculating sections respectively in case said absolute value of said steering torque is smaller than said plural torque thresholds; and
wherein said switching section is switched depending on a switching command of said automatic steering mode and said manual steering mode or said steering torque judging signal.

11. The electric power steering apparatus according to claim 10, wherein
said torque integral judging section comprises an LPF in a front stage of said plural torque value comparing sections.

12. The electric power steering apparatus according to claim 10, wherein
said plural torque value comparing sections respectively include a function for outputting said absolute value when said absolute value is equal to or larger than a self-corresponding torque threshold, and outputting 0 and at the same time outputting a past-value initializing signal to initialize self-corresponding said integral calculating section when said absolute value is smaller than said self-corresponding torque threshold.

13. The electric power steering apparatus according to claim 10, wherein
said switch judging section includes a function for outputting said steering torque judging signal when said plural integral values are respectively equal to or larger than corresponding said plural integral thresholds, and not outputting said steering torque judging signal in any other case.

14. The electric power steering apparatus according to claim 12, wherein
said switch judging section includes a function for outputting said steering torque judging signal when said plural integral values are respectively equal to or larger than corresponding said plural integral thresholds, and not outputting said steering torque judging signal in any other case.

15. The electric power steering apparatus according to claim 10, wherein
said switching section is switched in accordance with said steering torque judging signal so as to switch to said manual steering mode when said absolute value is equal to or larger than said self-corresponding torque threshold and said integral value becomes equal to or larger than said self-corresponding integral threshold in said automatic steering mode.

16. The electric power steering apparatus according to claim 12, wherein
said switching section is switched in accordance with said steering torque judging signal so as to switch to said manual steering mode when said absolute value is equal to or larger than said self-corresponding torque threshold and said integral value becomes equal to or larger than said self-corresponding integral threshold in said automatic steering mode.

17. The electric power steering apparatus according to claim 13, wherein
said switching section is switched in accordance with said steering torque judging signal so as to switch to said manual steering mode when said absolute value is equal to or larger than said self-corresponding torque threshold and said integral value becomes equal to or larger than said self-corresponding integral threshold in said automatic steering mode.

18. The electric power steering apparatus according to claim 14, wherein
said switching section is switched in accordance with said steering torque judging signal so as to switch to said manual steering mode when said absolute value is equal to or larger than said self-corresponding torque threshold and said integral value becomes equal to or larger than said self-corresponding integral threshold in said automatic steering mode.

19. The electric power steering apparatus according to claim 10, wherein
said plural torque value comparing sections and said plural integral calculating sections are respectively comprised of two sections.

20. The electric power steering apparatus according to claim 12, wherein
said plural torque value comparing sections and said plural integral calculating sections are respectively comprised of two sections.

* * * * *